Oct. 17, 1950   C. H. GILLESPIE   2,526,552
SPRING SUPPORTED TRACTOR SEAT
Filed Dec. 12, 1946
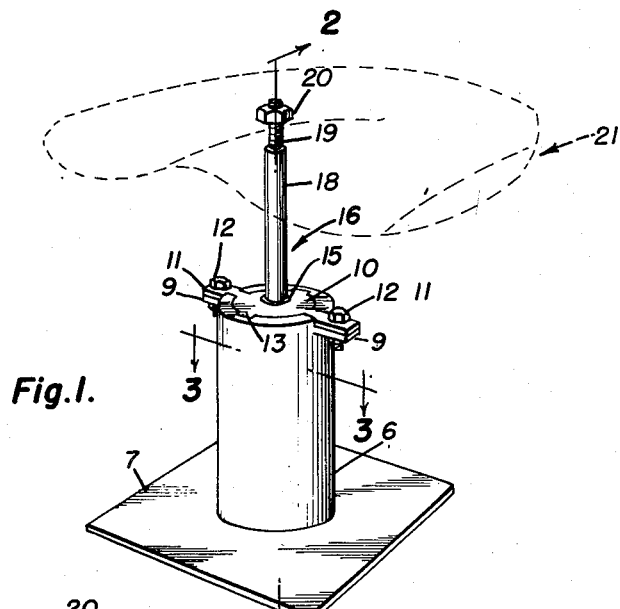
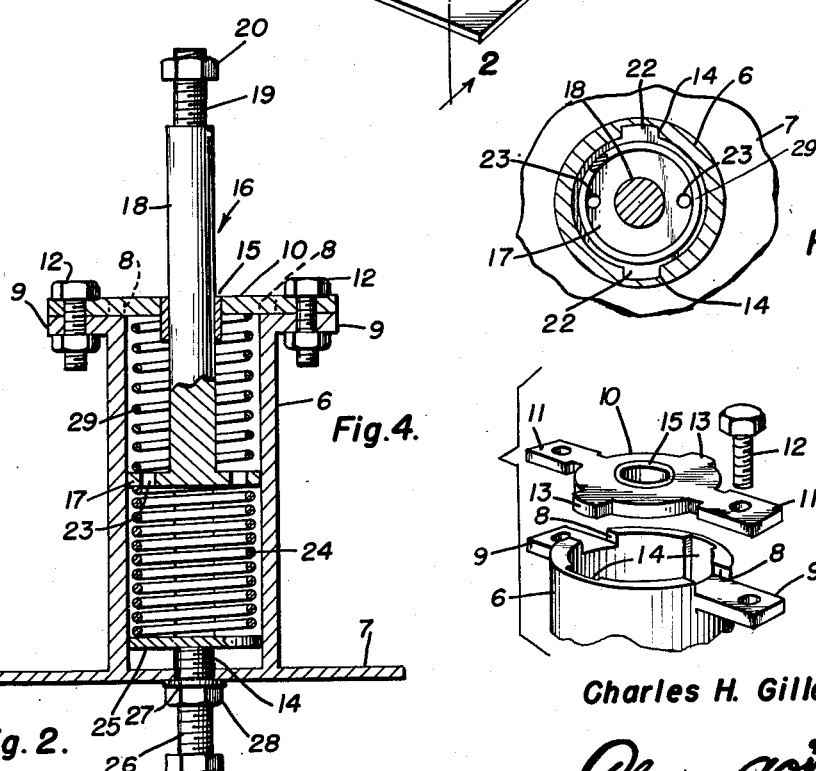
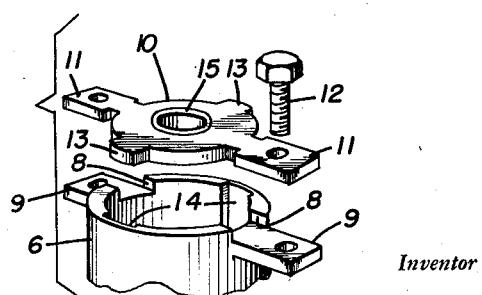
Inventor
Charles H. Gillespie Patented Oct. 17, 1950

2,526,552

UNITED STATES PATENT OFFICE 2,526,552

SPRING SUPPORTED TRACTOR SEAT

Charles H. Gillespie, Cedar City, Utah

Application December 12, 1946, Serial No. 715,858

1 Claim. (Cl. 155—52)

The present invention relates to structural and functional improvements in a novel seat stand which is expressly, but not necessarily, adapted for use on various kinds of farm machinery.

There exists a long felt need for a reliable and comfortable seat on all types of farming machines. It is, therefore, an object of the instant invention to provide a stand-type seat mount which fulfills the requirements of the manufacturer and users, this through the medium of properly chosen and mechanically coordinated parts, which go to make up said stand.

Another object of the invention has to do with a stand of the nature specified in which the construction is such that silenced cushioning results are attained, thus providing the user a smooth non-jolting ride.

A further object has to do with a construction which is simple, economical, strong and reliable, susceptible of ready installation and repairing, and which is otherwise aptly made and suitable in attaining the many ends desired.

Other objects, features and advantages will become more readily apparent from the following description and the accompanying illustrative drawings.

In the drawings, wherein like numerals are employed to designate like parts throughout the views:

Figure 1 is a perspective view of a stand constructed in accordance with the principles of the present invention.

Figure 2 is a vertical sectional view, with parts in elevation, this showing the complete construction and arrangement of parts, said view being on the line 2—2 of Figure 1, looking in the direction of the arrows.

Figure 3 is a horizontal cross-sectional view on the line 3—3 of Figure 1, also looking in the direction of the arrows.

Figure 4 is a fragmentary view showing the upper end of the cylinder and closing cap therefor.

The entire construction and arrangement, is observable in Figure 2 in which it will be seen that the numeral 6 designates an open top cylinder mounted on a base plate 7 suitable for attaching the stand to the machine on which same is to be used. The upper end of the cylinder is provided with diametrically opposite notches 8 and below the notches with outstanding lugs 9. The closing cap or plate, which is of flat annular form, is denoted by the numeral 10 and fits down on and within the confines of the upper end portion of said cylinder. It is provided with diametrically opposite apertured ears 11 lined up with the lugs 9 and secured thereto by bolt and nut means 12. Diametrically opposite outstanding key-lugs 13 are also provided and these fit down into keyways 14 grooved in the internal wall of said cylinder. The numeral 15 designates a bushing.

The reciprocatory plunger unit is denoted by the numeral 16 and embodies a disk-like head 17 and rod 18, the rod being slidable in the bushing and having a reduced screw-threaded upper end 19 with a nut 20 to support and secure the seat 21. As shown in Figure 3 said head is provided with diametrically opposite key-lugs 22 and these slide in the keyways 14. The head is also provided with apertures 23 providing vents. Incidentally, and in practice the cylinder is partially filled with oil but primarily for lubricating the parts. The normal oil level (not shown) is about even with the central position of the piston head as shown in Figure 2.

On one side of the head and confined in the lower half portion of the cylinder is a relatively stiff coiled spring 24 to cushion the "in" and "down" stroke of the plunger. In the lower portion of the cylinder is a spring tensioning follower plate 25 adjusted by a set-screw 26. The latter is threaded through the bottom of the cylinder and, in turn, provided with a rubber sealing washer 27 held in place against the bottom of the base plate 7 by a lock-nut 28. In the upper half portion of the cylinder is a lighter rebound spring 29. These two springs on opposite sides of the head and properly confined in the cylinder serve to attain the desired shock-absorbing and cushioning results.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what I claim as new is:

A heavy duty seat stand for use on farming machines comprising a cylinder having a base to be mounted on said machine, a relatively stiff coiled spring confined in the lower half-portion of said cylinder, a plunger including a head slidable in said cylinder and resting on the upper end of said spring, said plunger including a rod and the upper end of said rod being constructed to accommodate a detachable seat, and a second lightly coiled spring in said cylinder, located in the upper portion of the cylinder and between the upper end of the cylinder and upper side of said plunger head, said cylinder being provided with internal diametrically opposite grooves forming keyways, said plunger head having keylugs slidable in said keyways, the upper end of said cylinder being open, a removable closing cover for said open upper end, a follower plate in the lower portion of the cylinder, the lower end of said first named spring resting on said follower plate, and a regulating screw inserted through the bottom of the cylinder and into the cylinder and engaging the follower plate for positioning the follower plate to tension the coacting first named spring.

CHARLES H. GILLESPIE.

REFERENCES CITED

The following references are of record in the file of this patent:

UNITED STATES PATENTS

| Number | Name | Date |
| --- | --- | --- |
| 889,637 | Rowell | June 2, 1908 |
| 1,215,736 | Stafford | Feb. 13, 1917 |
| 2,298,230 | Radke | Oct. 6, 1942 |
| 2,359,268 | Jacobs | Sept. 26, 1944 |

FOREIGN PATENTS

| Number | Country | Date |
| --- | --- | --- |
| 19,991 | Great Britain | 1909 |